United States Patent [19]

Uchinuma

[11] Patent Number: 5,440,737
[45] Date of Patent: Aug. 8, 1995

[54] FILE-ALLOCATION CONTROL SYSTEM FOR ALLOCATING FILES ACCORDING TO USER-PROGRAM PRIORITY AND STORAGE VOLUME PERFORMANCE

[75] Inventor: Masako Uchinuma, Tokyo, Japan

[73] Assignee: NEC Corporation, Tokyo, Japan

[21] Appl. No.: 273,154

[22] Filed: Jul. 22, 1994

[30] Foreign Application Priority Data

Jul. 23, 1993 [JP] Japan ................. 5-202833

[51] Int. Cl.$^6$ .............................................. G06F 12/02
[52] U.S. Cl. .................. 395/600; 395/497.01; 395/658; 364/DIG. 2
[58] Field of Search ............. 395/600, 425, 325

[56] References Cited

U.S. PATENT DOCUMENTS

| | | | |
|---|---|---|---|
| 4,542,458 | 9/1985 | Kitajima et al. | 395/650 |
| 4,754,399 | 6/1988 | Yamamoto et al. | 395/250 |
| 5,131,087 | 7/1992 | Warr | 395/425 |
| 5,212,786 | 5/1993 | Sathi | 395/600 |
| 5,241,672 | 8/1993 | Slomcenski et al. | 395/600 |
| 5,249,288 | 9/1993 | Ippolito et al. | 395/575 |
| 5,301,350 | 4/1994 | Rogan et al. | 395/800 |
| 5,321,816 | 6/1994 | Rogan et al. | 395/200 |
| 5,333,311 | 7/1994 | Whipple II | 395/600 |
| 5,333,315 | 7/1994 | Saether et al. | 395/600 |
| 5,345,584 | 9/1994 | Hill | 395/600 |

OTHER PUBLICATIONS

"ACOS Software ACOS-4/XVP", *Job Management Reference Manual*, by NEC Corporation, Oct. 1992.

Primary Examiner—Thomas G. Black
Assistant Examiner—Peter Y. Wang
Attorney, Agent, or Firm—Young & Thompson

[57] ABSTRACT

A volume group 4 consists of a plurality of volume subgroups 41 to 4n. For example, volume subgroup 41 includes volumes 41-1 to 41-a on electronic disk units, and volume subgroup 4n includes volumes 4n-1 to 4n-d on magnetic disk units. Prioritized volume subgroups Table 5 for temporary file allocation contains priority values 11 to 1m to be assigned to user programs and the corresponding prioritized volume subgroups 511 to 51m. At the request of temporary file allocation from the user program, a temporary file allocation means 2 receives the priority 11 from a priority returning means 3, and in reference to the prioritized volume subgroups Table 5, allocates the temporary files preferentially to suitable volumes of a volume subgroup included in the corresponding prioritized volume subgroup to the priority value 11.

23 Claims, 2 Drawing Sheets

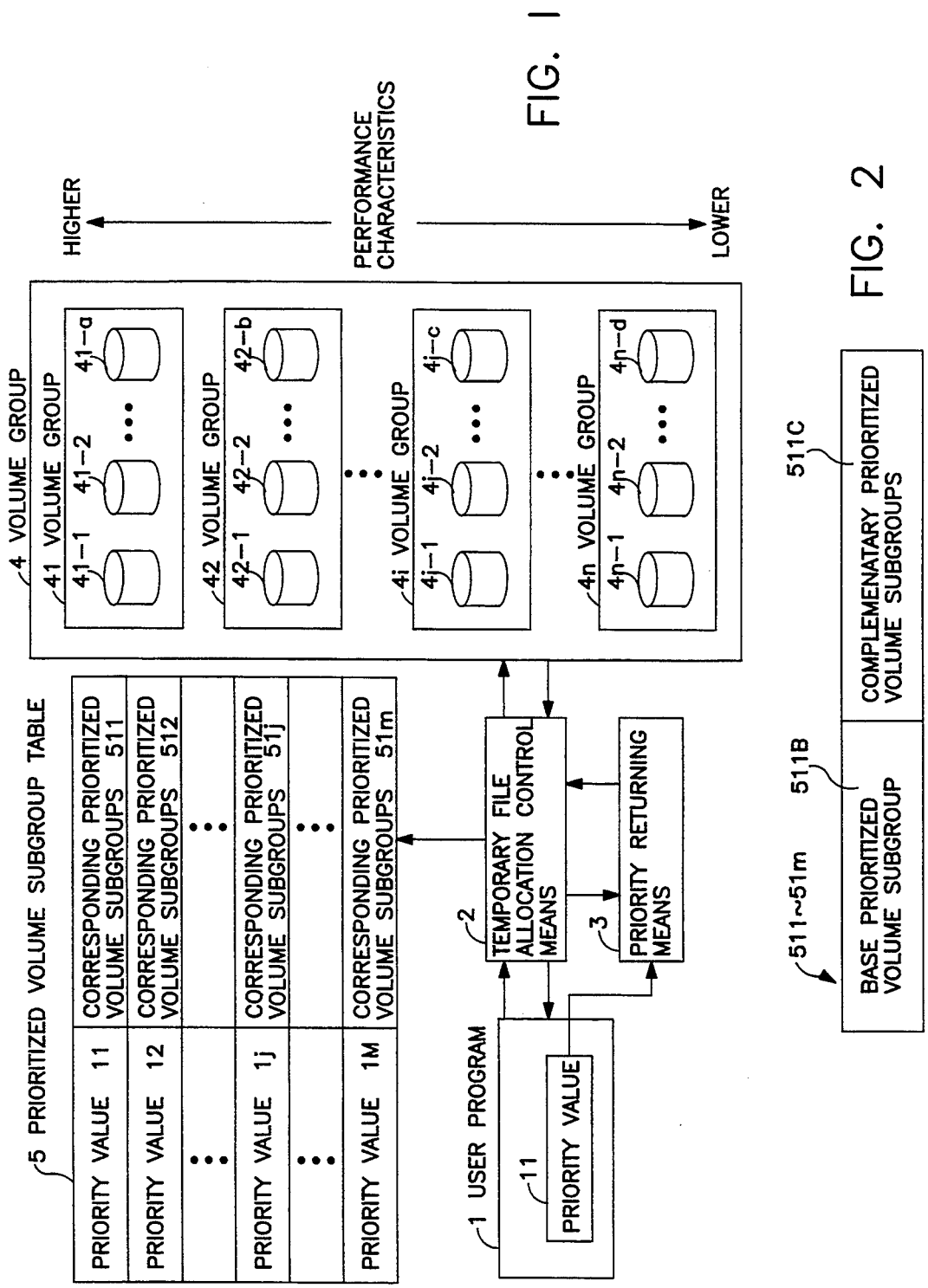

FILE-ALLOCATION CONTROL SYSTEM FOR ALLOCATING FILES ACCORDING TO USER-PROGRAM PRIORITY AND STORAGE VOLUME PERFORMANCE

BACKGROUND OF THE INVENTION

1. Field of the Invention

This invention relates to a file-allocation control system for use in computer systems having a plurality of mass storage units.

2. Description of the Related Art

The job management function of the operating system allows a user program which requests allocation of the file space to a plurality of resident or public volumes to designate not specified volume names but a volume group consisting of a number of volumes in a job control statement.

Once the user program requests such allocation of file space by designating a volume group, the job management function will select free space and allocate it to the files of the user-program according to the following rules as disclosed in "ACOS-4/XVP Job Management Reference Manual, DDA81E-2, NEC CORPORATION, 1992, pp. 6-90 to 6-96".

(1) Change the start volume of checking cyclically.

(2) Allocate the volumes in decreasing order of space available.

(3) Allocate the volumes in increasing order of I/O load into/from them.

In special circumstance may be adopted the rule:

(4) Always check the volumes in the same sequence.

These rules are effective for a volume group consisting of disk units of similar performance characteristics, e.g. access speeds.

In recent computer systems however magnetic and electronic disk units of different performances are introduced. The mixed construction of such disk units of different performances included in a volume group may not allow according to circumstances the above-mentioned rules to be effective because the processing times are greatly different among the different types of disk units to which the files are allocated.

The problem mentioned above can be solved by management of disk units for forming them into volume groups of different speed levels. In this case it is needed for the user program to previously recognize what speed level of disk units individual volume groups are composed of and notably to designate what volume group should be used.

SUMMARY AND OBJECTS OF THE INVENTION

It is an object of the invention to provide a file-allocation control system for use in a computer system having disk units of different performances combined to allocate the temporary or permanent files associated with a user program to permit the user program to exhibit the fullest processing efficiency.

Another object of the invention is to provide a file-allocation control system for allocating the files associated with the user program to suitable volumes of a volume group having the corresponding performance to the user-program priority without requiring the user to designate to the user program the volumes to which the files should be allocated.

A further object of the invention is to provide a file-allocation control system permitting, when allocation of the files to volumes of the volume group having the corresponding performance to the priority of the user program has failed, to allocate the files to other volume group having a lower priority, and accordingly the files of a user program assigned a higher priority can be allocated with a lower probability of failure.

The first embodiment is a file-allocation control system which comprises:

a volume group consisting of a plurality of volume subgroups each including at least one volume on each disk unit;

a prioritized volume subgroups Table listing priority values assigned to user programs in the computer system and the corresponding prioritized volume subgroups; and a file-allocation control means for allocating, in response to the request of the user program for file-allocation, the files preferentially to volumes of the corresponding prioritized volume subgroup to the priority value assigned to the user program.

The second embodiment in combination with the first embodiment is characterized in that volumes of the same volume subgroup have the same access time, and volumes of different volume subgroups, respectively, have different access times.

The third embodiment in combination with the second embodiment comprises volume subgroups including volumes on magnetic disk units and volume subgroups including volumes on electronic disk units.

The fourth embodiment in combination with the second embodiment is characterized in that temporary files are allocated.

The fifth embodiment in combination with the third embodiment is characterized in that temporary files are allocated.

The sixth embodiment in combination with the second embodiment is characterized in that permanent files are allocated.

The seventh embodiment in combination with the third embodiment is characterized in that permanent files are allocated.

The eighth embodiment in combination with the fourth embodiment is characterized in that the prioritized volume subgroups Table contains priorities and the corresponding prioritized volume subgroups including a base volume subgroup and zero, one, or more complementary volume subgroups of slower access speeds than that of the base prioritized volume subgroup; and the file-allocation control means allocates, in response to the request of the user program for file-allocation, the files preferentially to volumes included in the base prioritized volume subgroup, and when the file-allocation fails, to volumes included in the complementary volume subgroups if specified.

The ninth embodiment in combination with the fifth embodiment is characterized in that the prioritized volume subgroups Table contains priorities and the corresponding prioritized volume subgroups including a base prioritized volume subgroup and zero, one, or more complementary volume subgroups of slower access speeds than that of the base prioritized volume subgroup; and the file-allocation control means allocates, in response to the request of the user program for file allocation, the files preferentially to volumes included in the base prioritized volume subgroup, and when the file-allocation fails, to volumes included in the complementary volume subgroups if specified.

The tenth embodiment in combination with the sixth embodiment is characterized in that the prioritized volume subgroups Table contains priorities and the corresponding prioritized volume subgroups including a base prioritized volume subgroup and zero, one, or more complementary volume subgroup of slower access speeds than that of the base prioritized volume subgroup; and the file-allocation control means allocates, in response to the request of the user program for file-allocation therefor, the files preferentially to volumes included in the base prioritized volume included in the complementary volume subgroups if specified.

The eleventh embodiment in combination with the seventh embodiment is characterized in that the prioritized volume subgroups Table contains priorities and the corresponding prioritized volume subgroups including a base prioritized volume subgroup anc zero, one, or more complementary volume subgroups of slower access speeds than that of base prioritized volume subgroup; and the file-allocation control means allocated, in response to the request of the user program for file-allocation, the files preferentially to volumes included in said base prioritized volume subgroup, and when the file-allocation fails, to volumes included in the complementary volume subgroups if specified.

The twelfth embodiment in combination with the eighth embodiment is characterized in that a base prioritized volume subgroup of higher priority is composed of shorter-access-time volumes.

The thirteenth embodiment in combination with the ninth embodiment is characterized in that a base prioritized volume subgroup of higher priority is composed of shorter-access-time volumes.

The fourteenth embodiment in combination with the tenth embodiment is characterized in that a base prioritized volume subgroup of higher priority is composed of shorter-access-time volumes.

The fifteenth embodiment in combination with the eleventh embodiment is characterized in that a base prioritized volume subgroup of higher priority is composed of shorter-access-time volumes.

BRIEF DESCRIPTION OF THE DRAWINGS

The above-mentioned and other objects, features and advantages of this invention will become more apparent by reference to the following detailed description thereof in conjunction with the accompanying drawings, wherein:

FIG. 1 is a block diagram of an embodiment of the present invention;

FIG. 2 is a diagram of the construction of each prioritized volume subgroup in the prioritized volume subgroups Table according to an embodiment of the present invention.

In these drawings, the components or parts corresponding to each other are designated by the same reference characters.

DETAILED DESCRIPTION OF PREFERRED EMBODIMENTS

Figure 3:
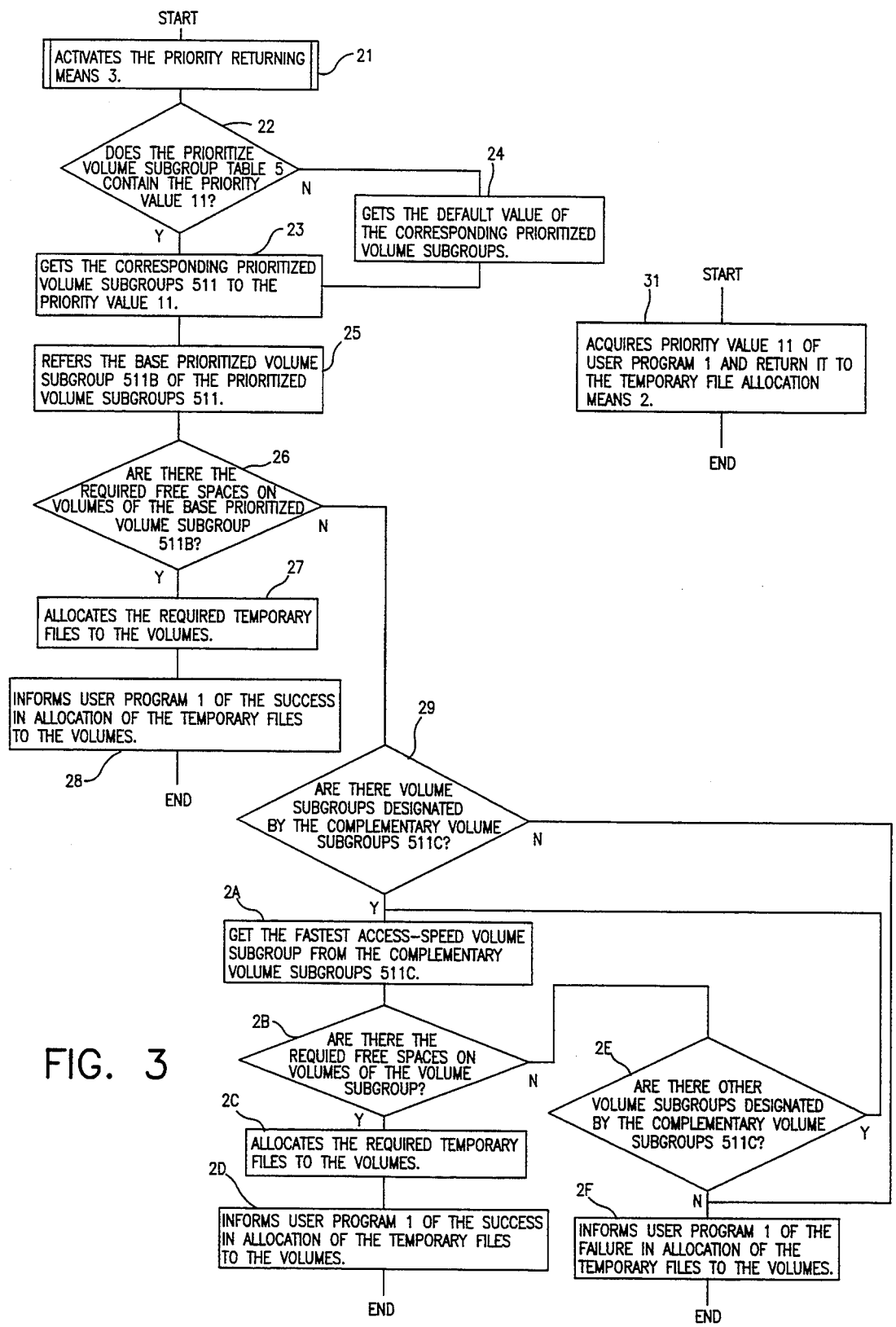
FIG. 3 is a flow chart for illustrating the control by the temporary file allocation means 2 and the function of the priority returning means 3.

An embodiment of the invention will be set forth more fully with reference to the accompanying drawings below.

Referring to FIG. 1, the file-allocation control system is comprised of a temporary file allocation control means 2, a priority returning means 3, a volume group 4, and a prioritized volume subgroups Table 5. It is constructed so that in response to the request for a temporary file allocation from the user program 1 having a priority value 11, the temporary files may be allocated preferentially to the disk unit of the corresponding access speed to the priority value 11.

Volume group 4 consists of volume subgroups 41, 42, ..., 4$i$, ..., 4$n$. Volume subgroup 41 includes volumes 41-1, 41-2, ..., 41-$a$ on disk units, respectively, whose access times are approximately equal, i.e. there is little difference in access time between the volumes of the same subgroup. The same is applied to any other volume subgroup, 42 including volumes 42-1, 42-2, ..., 42-$b$, ...; 4$i$ including volumes 4$i$-1, 4$i$-2, ..., 4$i$-$c$; ...; and 4$n$ including volumes 4$n$-1, 4$n$-2, ..., 4$n$-$d$.

On the other hand, there are significant differences in disk-unit access time between the volume subgroups. In this embodiment it is assumed that the volume subgroups are listed in decreasing order of disk-unit access speed, as 41 (the fastest), 42, ..., 4$i$, ..., 4$n$. However, there is not always a significant difference in disk-unit access speed between the volume subgroups, i.e. according to circumstances there may be a plurality of volume subgroups having much the same disk-unit access speed.

For example, electronic disk units are used as faster access-speed or high-speed disk units, and magnetic disk units are used as lower-speed disk units.

The prioritized volume subgroups Table 5 for temporary file allocation lists all priority values 11, 12, ..., 1$j$, ..., 1$m$ to be assigned to user programs, and prioritized volume subgroups 511, 512, ..., 51$j$, ..., 51$m$ corresponding to the priority values, respectively. The temporary files associated with the user programs can be allocated to the prioritized volume subgroups. Each prioritized subgroup is allowed to consist of one or more volume subgroups 41 to 4$n$.

Each prioritized volume subgroups 511, ..., or 51$m$ are constructed, as shown in FIG. 2, of a base prioritized volume subgroup 511B, ..., 51$m$B and zero, one or more complementary prioritized volume subgroups 511C, ..., and 51$m$C the access speeds of which are not faster than that of the corresponding base prioritized volume subgroup. In this embodiment, assuming that the priority values decreased in order from the highest 11 to the lowest 1$m$ as listed in FIG. 1, the base prioritized volume subgroup 511B corresponding to priority value 11 designates volume subgroup 41, and the complementary prioritized volume subgroups 511C designate all the remaining volume subgroups 42, ..., 4$i$, ..., 4$n$ in this order. The base prioritized volume subgroup 512B designates volume subgroup 42, and complementary prioritized volume subgroups 512C designates all the remaining volume subgroups 43 ..., 4$i$, ..., 4$n$ which are not faster in access speed that the base prioritized volume subgroup 512B. Similar designation is applied to the other base and complementary prioritized volume subgroups in decreasing order of priority value. Furthermore the base prioritized volume subgroup 51mB corresponding to the lowest priority value 1m the slowest-access-speed volume subgroup 4n, of volume group 4, and hence the complementary prioritized volume subgroup 51mC does not designate the volume subgroup.

Priority value 11 assigned to the user program 1 represents the priority for executing the user program 1 in the computer system. The value is designated by the user when the user program 1 was inputted. Unless the user designates the priority value 11, the operating system designates a default value as priority value 11 to the user program 1.

The operation of this embodiment constructed as above-mentioned will be set forth below with reference especially to the flow chart of FIG. 3.

In response to the request from user program 1 for a temporary file allocation, the temporary file allocation control means 2 activates the priority returning means 3 (Step 21).

Then, the priority returning means 3 acquires a priority value 11 of user program 1 and returns it to the temporary file allocation control means 2 (Step 31).

On receiving priority value 11, the temporary file allocation control means 2 starts the following control sequence:

Firstly, it refers to the prioritized volume subgroups Table 5 for temporary file allocation with respect to priority value 11 (Step 22). Since the prioritized volume subgroups Table 5 contains priority value 11 and the corresponding prioritized volume subgroup 511, i.e. the answer in Step 22 is YES, the control is transferred to Step 23 where prioritized volume subgroups 511 are designated, and to Step 25. If priority value 11 and/or the corresponding prioritized volume subgroup 511S are not registered in the prioritized volume subgroups Table 4, i.e. if the answer is NO, the control is transferred to Step 24 where a default priority value such as 1m, and the corresponding prioritized volume subgroups 51m are designated, and control is then transferred to Step 25.

In Step 25, the base prioritized volume subgroup corresponding to the designation in Step 23 or Step 24 is extracted, and checked in the next Step 26 to decide whether there is on volumes of this base prioritized volume subgroup enough free space. If YES, the control is transferred to Step 27, the temporary files are allocated to the volumes, and this information is sent to the user program 1 (Step 28).

For example, the prioritized volume subgroups 511 are selected in Step 23, and the corresponding base prioritized volume subgroup 511B designates volume subgroup 41 in Step 25. Then the control is transferred to Step 27, component volumes 41-1 to 41-a of volume subgroup 41 are checked to search free space according to the following rules:

(1) Change the start volume of checking cyclically.

(2) Allocate volumes in decreasing order of free space available.

(3) Allocate the volumes in increasing order of I/O load into/from them.

(4) Always check the volumes in the same sequence.

In decision Step 26, a check of whether there is more free space than required on component volumes of base prioritized volume subgroup 511B is made. If NO, the control is transferred to Step 29 where complementary prioritized volume subgroups 511C are checked to decide whether volume subgroups thereof is designated, or not. If YES, the control is transferred to Step 2A where the fastest access-speed volume subgroup only is selected and then in the next Step 2B, checked to decide whether its component volumes have more free space thereon than required. If YES, the control is transferred to Step 2C where the requested temporary file is allocated to these volumes, the user program 1 being informed of this in Step 2D.

In Step 2B, if NO, the control is transferred to Step 2E where the complementary prioritized volume subgroups 511C are checked to decide whether there are other subgroups designated by it. If YES, the control is returned to Step 2A.

By the way, for example, whether there is enough free space on all the volumes 41-1 to 41-a included in volume subgroup 41 designated by the base prioritized volume subgroup 511B is checked, and if NO, then it is decided whether there are volume subgroups designated by the complementary prioritized volume subgroups 511C. If YES, check is made for the designated volume subgroups 42, . . . , 4i, . . . , in decreasing order of access speed, assuming to be designated so, and in-sequence check is made for volumes of each designated volume subgroup. Thus, if suitable volumes are found, file allocation to them is performed. This file-allocation control enables a complementary file-allocation is the case where file allocation to the base prioritized volume subgroup is impossible, although the access speed is slower than that to the volumes of the base prioritized volume subgroup. Furthermore, the probability of failing in file allocation decreases with the increasing priority of the user program.

If NO in both Steps 29 and 2E, information of "error" that temporary file allocation has failed is sent to the user program 1 (Step 2F).

In this embodiment, the allocation control is applied to temporary files, and is also applicable to permanent files.

As described above, a principal features of the invention resides in that the prioritized volume subgroups Table lists the priority values of the user programs which represents their priority in the computer system and the corresponding prioritized volume subgroups, and in response to the request from user program for file allocation, the file-allocation control means allocates the files preferentially to volumes included in a designated volume subgroup in reference to the prioritized volume subgroups Table.

The above-mentioned features of the invention have the effect of permitting to allocate the temporary of permanent files associated with the user program so that this user program can have the highest possible processing efficiency especially in the computer system comprising disk units of different performance levels.

The invention has the further effect of allocating the files associated with the user program to volumes of the volume group of the corresponding performance to the priority of the user program without requiring the user to designate volumes to which the files should be allocated by the user program.

The invention has the further advantage that also in the case where it is impossible to allocate the files to volumes of the volume group of the performance corresponding to the priority of the user program, the files associated with the user program having a higher priority can be allocated to other volume group but with a lower probability of failing in file allocation.

Although the invention has been described in detail above in connection with various preferred embodiments thereof, it will be appreciated by those skilled in the art that these embodiments have been provided solely for purposes of illustration, and are in no way to be considered as limiting the invention. Instead, various modifications and substitutions of equivalent techniques will be readily apparent to those skilled in the art upon reading this specification, and such modifications and substitutions are to be considered as falling within the true scope and spirit of the following claims.

What is claimed is:

1. A file-allocation control system in a computer system having a plurality of mass storage units each storing an individual volume and comprising:
    a volume group comprising a plurality of volume subgroups each including at least one volume on each mass storage unit;
    a prioritized volume subgroups table listing priority values assigned to a plurality of user programs in the computer system and also listing prioritized volume subgroups corresponding to said priority values; and
    a file-allocation control means for allocating, in response to a request of one of said plurality of user programs, files preferentially to volumes of prioritized volume subgroups corresponding to the priority values assigned to said plurality of user programs, wherein if said preferential allocation fails, said files are allocated to volume subgroups other than said volume subgroups corresponding to the priority values assigned to said plurality of user programs.

2. A file-allocation control system as claimed in claim 1, wherein volumes of a same volume subgroup are stored on mass storage units having a same performance characteristic, and volumes of different volume subgroups, are stored on mass storage units having different performance characteristics.

3. A file-allocation control system as claimed in claim 2, wherein temporary files are allocated.

4. A file-allocation control system as claimed in claim 3, wherein
    said prioritized volume subgroup table listing said priority values and said prioritized volume subgroups comprises a base prioritized volume subgroup; and
    said file-allocation control means, in response to a request by one of said plurality of user programs, allocates the files preferentially to volumes included in said base prioritized volume subgroup.

5. A file-allocation control system as claimed in claim 4, wherein prioritized volume subgroups comprising volumes stored on mass storage units of higher performance characteristics are assigned a higher priority value than prioritized volume subgroups comprising volumes stored on mass storage units of lower performance characteristics.

6. A file-allocation control system as claimed in claim 3, wherein
    said prioritized volume subgroup table listing said priority values and said prioritized volume subgroups comprises a base prioritized volume subgroup and at least one complementary volume subgroup of volumes stored on mass storage units of lower performance characteristics than that of said base prioritized volume subgroup; and
    said file-allocation control means, in response to a request by one of said plurality of user programs, allocates the files preferentially to volumes included in said base prioritized volume subgroup, and when the file-allocation control means fails to allocate the files to volumes included in said base prioritized volume subgroup, to volumes included in said complementary volume subgroups.

7. A file-allocation control system as claimed in claim 6, wherein prioritized volume subgroups comprising volumes stored on mass storage units of higher performance characteristics are assigned a higher priority value than prioritized volume subgroups comprising volumes stored on mass storage units of lower performance characteristics.

8. A file-allocation control system as claimed in claim 2, wherein permanent files are allocated.

9. A file-allocation control system as claimed in claim 8, wherein
    said prioritized volume subgroups table listing said priority values and the said prioritized volume subgroups comprises a base prioritized volume subgroup; and
    said file-allocation control means, in response to a request by one of said plurality of user programs, allocates the files preferentially to volumes included in said base prioritized volume subgroup.

10. A file-allocation control system as claimed in claim 9, wherein prioritized volume subgroups comprising volumes stored on mass storage units of higher performance characteristics are assigned a higher priority value than prioritized volume subgroups comprising volumes stored on mass storage units of lower performance characteristics.

11. A file-allocation control system as claimed in claim 8, wherein
    said prioritized volume subgroups table listing said priority values and the said prioritized volume subgroups comprises a base prioritized volume subgroup and at least one complementary volume subgroup of volumes stored on mass storage units of lower performance characteristics than that of said base prioritized volume subgroup; and
    said file-allocation control means, in response to a request by one of said plurality of user programs, allocates the files preferentially to volumes included in said base prioritized volume subgroup, and when the file-allocation fails to allocate the files to volumes included in said base prioritized volume subgroup, to volumes included in said complementary volume subgroups.

12. A file-allocation control system as claimed in claim 11, wherein prioritized volume subgroups comprising volumes stored on mass storage units of higher performance characteristics are assigned a higher priority value than prioritized volume subgroups comprising volumes stored on mass storage units of lower performance characteristics.

13. A file-allocation control system as claimed in claim 2, wherein said volume group has volume subgroups comprising volumes stored on magnetic mass storage units and volume subgroups comprising volumes stored on electronic mass storage units.

14. A file-allocation control system as claimed in claim 13, wherein temporary files are allocated.

15. A file-allocation control system as claimed in claim 14, wherein
    said prioritized volume subgroup table listing said priority values and the said prioritized volume subgroups comprises a base prioritized volume subgroup and at least one complementary volume subgroup of volumes stored on said mass storage units of lower performance characteristics than that of said base prioritized volume subgroup; and said file-allocation control means, in response to a request by one of said plurality of user programs, allocates the files preferentially to volumes included in said base prioritized volume subgroup, and when the file-allocation control means fails to allocate the files to volumes included in said base prioritized volume subgroup, to volumes included in said complementary volume subgroups.

16. A file-allocation control system as claimed in claim 15, wherein prioritized volume subgroups comprising volumes stored on mass storage units of higher performance characteristics are assigned a higher priority value than prioritized volume subgroups comprising volumes stored on mass storage units of lower performance characteristics.

17. A file-allocation control system as claimed in claim 14, wherein said prioritized volume subgroup table listin9 said priority values and the said prioritized volume subgroups comprises a base prioritized volume subgroup; and said file-allocation control means, in response to a request by one of said plurality of user programs, allocates the files preferentially to volumes included in said base prioritized volume subgroup.

18. A file-allocation control system as claimed in claim 17, wherein prioritized volume subgroups comprising volumes stored on mass storage units of higher performance characteristics are assigned a higher priority value than prioritized volume subgroups comprising volumes stored on mass storage units of lower performance characteristics.

19. A file-allocation control system as claimed in claim 13, wherein permanent files are allocated.

20. A file-allocation control system as claimed in claim 19, wherein said prioritized volume subgroup table listing said priority values and the said prioritized volume subgroups comprises a base prioritized volume subgroup; and said file-allocation control means, in response to a request by one of said plurality of user programs, allocates the files preferentially to volumes included in said base prioritized volume subgroup.

21. A file-allocation control system as claimed in claim 20, wherein prioritized volume subgroups comprising volumes stored on mass storage units of higher performance characteristics are assigned a higher priority value than prioritized volume subgroups comprising volumes stored on mass storage units of lower performance characteristics.

22. A file-allocation control system as claimed in claim 19, wherein said prioritized volume subgroup table listing said priority values and the said prioritized volume subgroups comprises a base prioritized volume subgroup and at least one complementary volume subgroup of volumes stored on mass storage units of lower performance characteristics than that of said base prioritized volume subgroup; and said file-allocation control means, in response to a request by one of said plurality of user programs, allocates the files preferentially to volumes included in said base prioritized volume subgroup, and when the file-allocation fails to allocate the files to volumes included in said base prioritized volume subgroup, to volumes included in said complementary volume subgroups.

23. A file-allocation control system as claimed in claim 22, wherein prioritized volume subgroups comprising volumes stored on mass storage units of higher performance characteristics are assigned a higher priority value than prioritized volume subgroups comprising volumes stored on mass storage units of lower performance characteristics.

* * * * *